United States Patent
Bisson et al.

(10) Patent No.: US 9,061,934 B2
(45) Date of Patent: Jun. 23, 2015

(54) APPARATUS AND METHOD FOR TIGHT BENDING THIN GLASS SHEETS

(71) Applicants: Antoine Gaston Denis Bisson, Montigny Lencoup (FR); Curtis Richard Cowles, Corning, NY (US); Laurent Joubaud, Paris (FR); David John McEnroe, Corning, NY (US); Aniello Mario Palumbo, Painted Post, NY (US)

(72) Inventors: Antoine Gaston Denis Bisson, Montigny Lencoup (FR); Curtis Richard Cowles, Corning, NY (US); Laurent Joubaud, Paris (FR); David John McEnroe, Corning, NY (US); Aniello Mario Palumbo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 275 days.

(21) Appl. No.: 13/647,043

(22) Filed: Oct. 8, 2012

(65) Prior Publication Data
US 2013/0086948 A1  Apr. 11, 2013

Related U.S. Application Data

(60) Provisional application No. 61/545,332, filed on Oct. 10, 2011.

(51) Int. Cl.
*C03B 23/025* (2006.01)
(52) U.S. Cl.
CPC .................. *C03B 23/0258* (2013.01)
(58) Field of Classification Search
CPC ...... C03B 29/00; C03B 29/02; C03B 29/025; C03B 23/0235; C03B 23/025; C03B 23/0258
USPC .................................................. 65/106, 107
See application file for complete search history.

(56) References Cited

U.S. PATENT DOCUMENTS

| | | | | |
|---|---|---|---|---|
| 4,173,461 | A | * 11/1979 | Ebata et al. ...................... | 65/106 |
| 4,488,893 | A | * 12/1984 | Claassen et al. ................ | 65/287 |
| 4,797,144 | A | 1/1989 | DeMeritt et al. ................ | 65/102 |
| 5,004,491 | A | 4/1991 | McMaster et al. .............. | 65/106 |
| 5,192,353 | A | 3/1993 | Trentelman ...................... | 65/66 |
| 5,322,539 | A | 6/1994 | Mathisen et al. | |
| 5,501,717 | A | 3/1996 | Vehmas et al. .................. | 65/104 |
| 5,656,052 | A | * 8/1997 | Boardman et al. ............. | 65/103 |
| 5,695,537 | A | 12/1997 | Sykes .............................. | 65/106 |
| 5,755,845 | A | 5/1998 | Woodward et al. ............. | 65/102 |
| 6,257,022 | B1 | 7/2001 | Caplan et al. ................... | 65/107 |
| 7,000,430 | B1 | * 2/2006 | Fotheringham et al. ....... | 65/33.2 |
| 8,397,540 | B2 | * 3/2013 | Dannoux et al. ............... | 65/291 |
| 8,549,885 | B2 | * 10/2013 | Dannoux et al. ............... | 65/359 |
| 8,816,252 | B2 | * 8/2014 | Bisson .......................... | 219/388 |
| 8,833,106 | B2 | * 9/2014 | Dannoux et al. ............... | 65/106 |
| 2002/0020192 | A1 | * 2/2002 | Bader et al. ..................... | 65/33.1 |

(Continued)

FOREIGN PATENT DOCUMENTS

| CN | 1980866 | 6/2007 |
|---|---|---|
| EP | 885851 | 12/2006 |

(Continued)

*Primary Examiner* — Joseph S Del Sole
*Assistant Examiner* — Russell Kemmerle, III
(74) *Attorney, Agent, or Firm* — Jason A. Barron

(57) ABSTRACT

An apparatus and methods for bending sheet glass are disclosed. The present invention improves on the state-of-the-art by providing apparatus and methods that prevent unwanted distortion of the glass sheet. The apparatus and methods utilize localized heating at the bend to allow for overall glass sheet temperatures to be reduced, along with optional mechanical devices for improved bend quality.

18 Claims, 13 Drawing Sheets

(56) References Cited

U.S. PATENT DOCUMENTS

| | | | |
|---|---|---|---|
| 2010/0000259 A1 | 1/2010 | Ukrainczyk et al. | 65/104 |
| 2010/0129602 A1* | 5/2010 | Dejneka | 428/130 |
| 2010/0140848 A1* | 6/2010 | Provence | 264/339 |
| 2010/0287989 A1 | 11/2010 | Tetlow et al. | 65/107 |
| 2012/0114901 A1* | 5/2012 | Uraji et al. | 428/121 |
| 2012/0131961 A1* | 5/2012 | Dannoux et al. | 65/103 |
| 2012/0279257 A1* | 11/2012 | Dannoux et al. | 65/103 |
| 2013/0125592 A1* | 5/2013 | Bisson | 65/273 |
| 2013/0329346 A1* | 12/2013 | Dannoux et al. | 361/679.01 |
| 2013/0337224 A1* | 12/2013 | Odani et al. | 428/130 |
| 2014/0065366 A1* | 3/2014 | Joubaud | 428/141 |

FOREIGN PATENT DOCUMENTS

| | | |
|---|---|---|
| FR | 2391962 A1 | 12/1978 |
| JP | 55085429 A | 6/1980 |
| JP | 63021229 A | 1/1988 |
| JP | 2000327349 A | 11/2000 |
| JP | 2004277203 | 7/2004 |
| JP | 2004223791 | 12/2004 |
| JP | 2004223792 | 12/2004 |
| JP | 2004223809 | 12/2004 |
| JP | 2005035873 | 10/2005 |
| JP | 4257906 | 4/2009 |
| WO | WO2010002446 | 1/2010 |

* cited by examiner

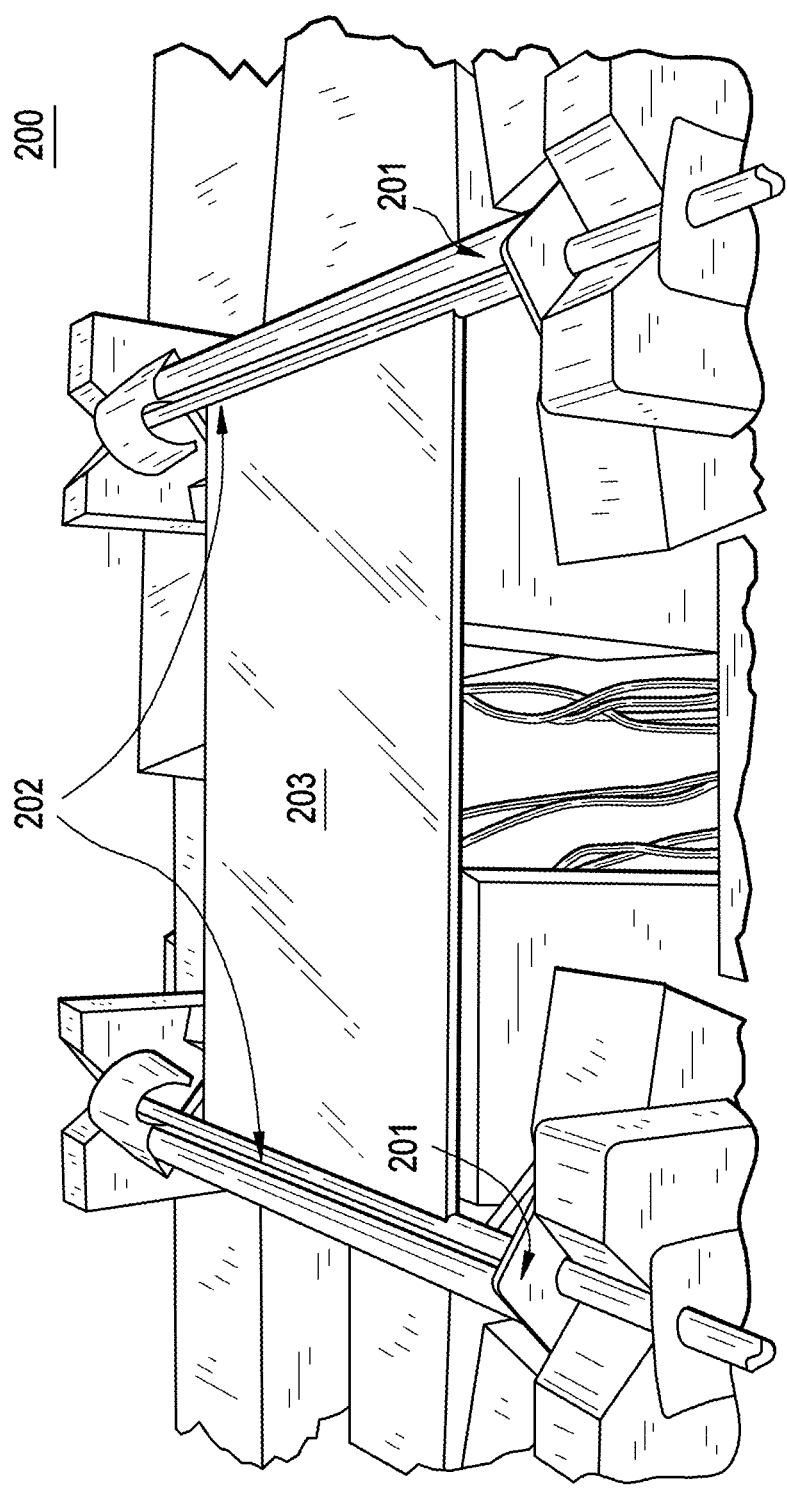

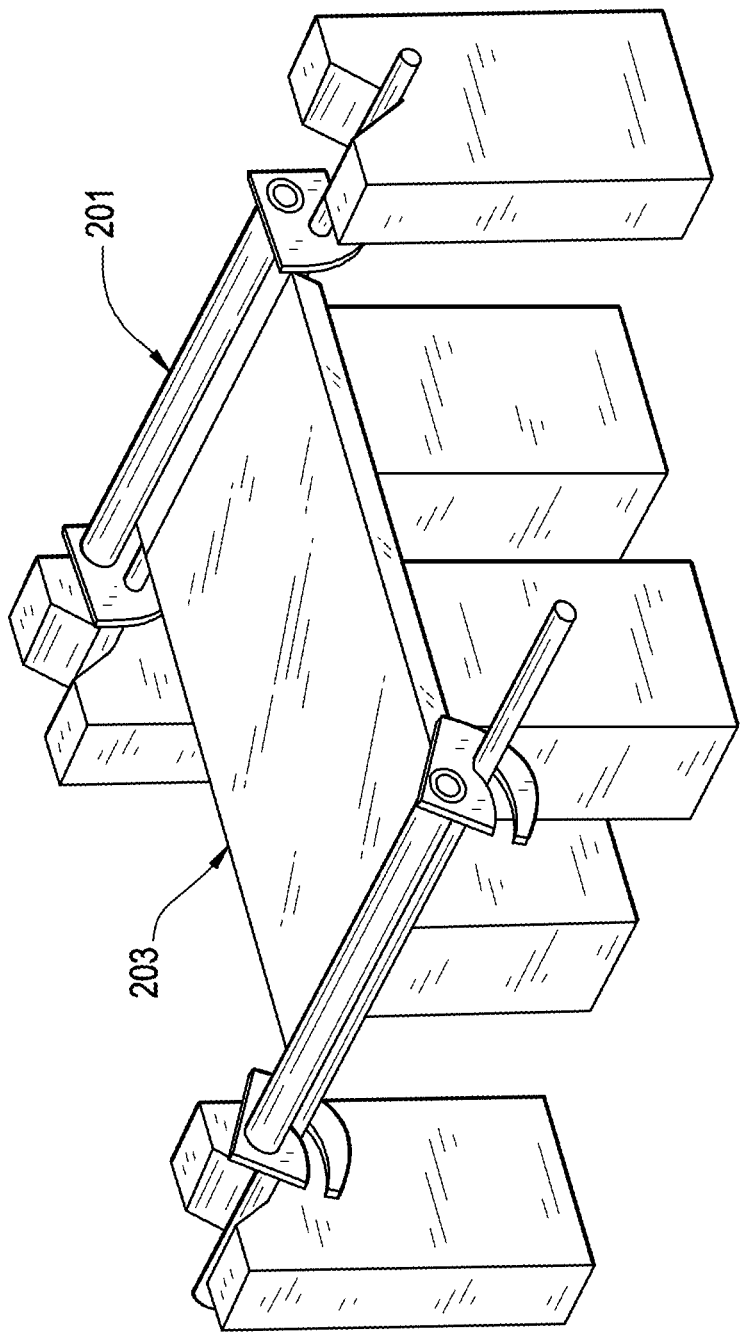

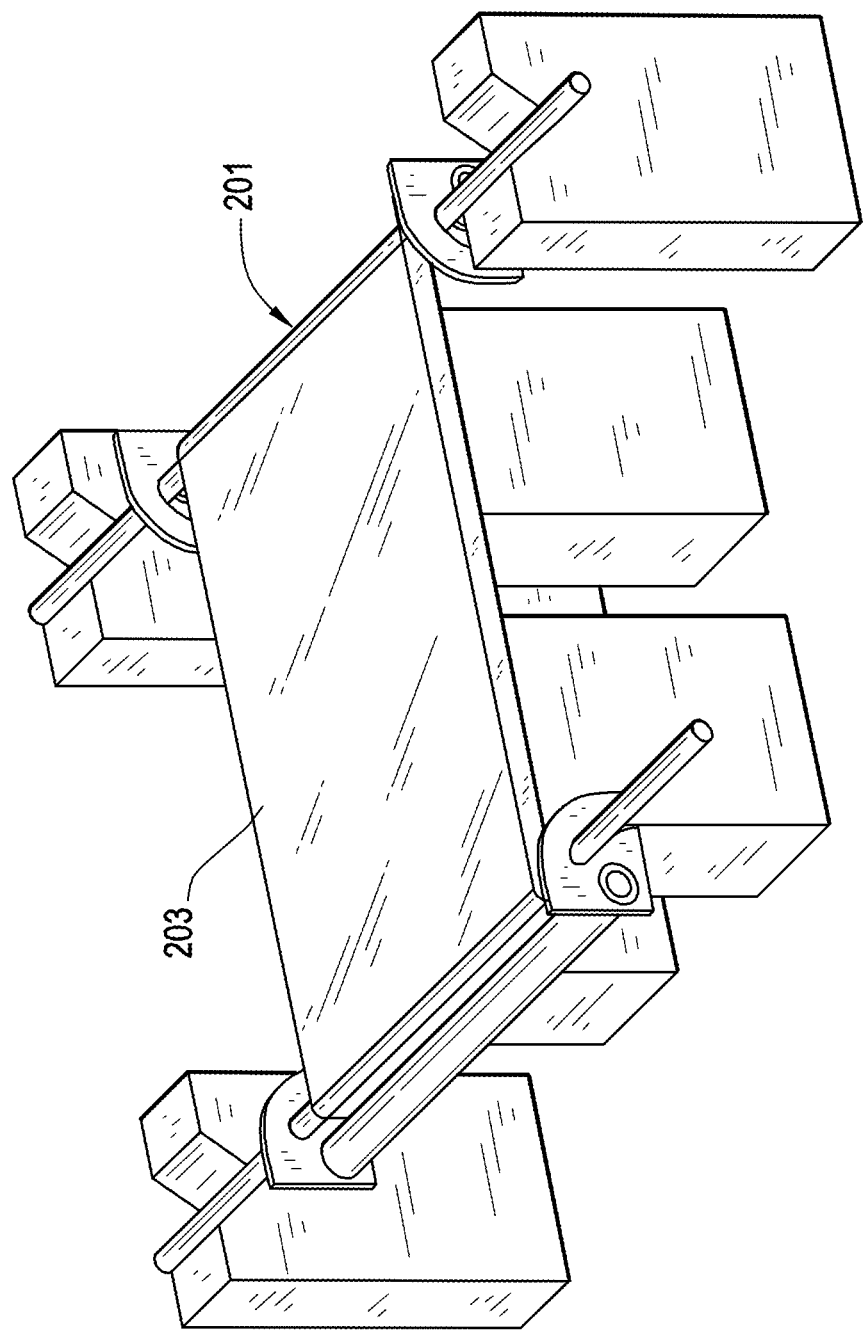

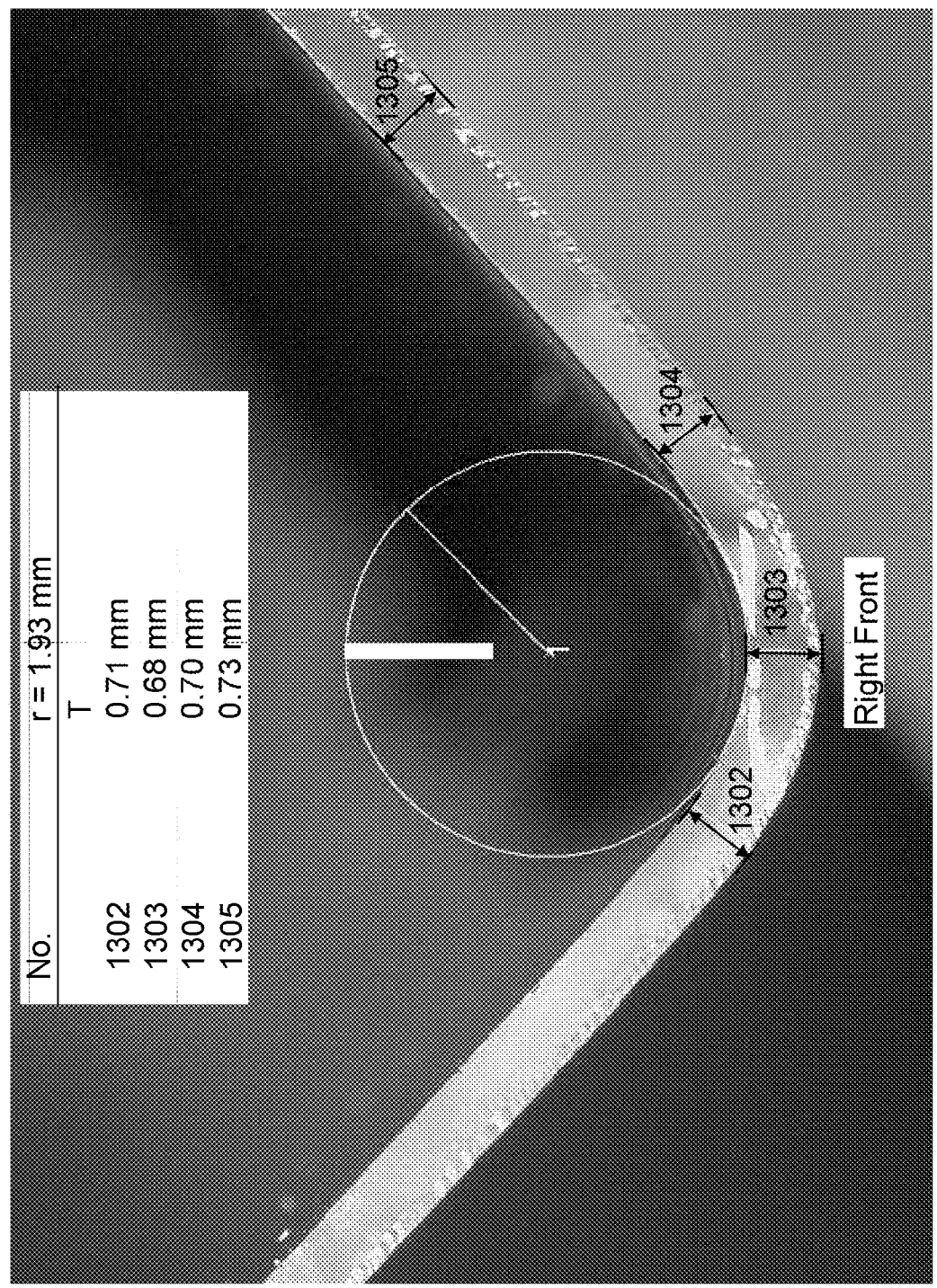

APPARATUS AND METHOD FOR TIGHT BENDING THIN GLASS SHEETS

This application claims the benefit of priority under 35 U.S.C. §119 of U.S. Provisional Application Ser. No. 61/545,332 filed on Oct. 10, 2011 the content of which is relied upon and incorporated herein by reference in its entirety.

FIELD

The present disclosure relates generally to apparatus and methods for forming tight bends and shapes in thin glass sheets. The apparatus and methods provide the ability to reshape thin glass sheets into complex geometries with minimal distortion while retaining the surface quality of the glass. Additional advantages include use with large sheet glass sizes, lower preheating temperatures, and shorter cycle times, all of which result in cost savings.

BACKGROUND

The emergence of chemically strengthen glass, especially glass that can be manufactured in large thin sheet sizes by fusion forming, has opened up market segments in a variety of consumer areas. These new markets include the use of thin sheet glass in electronic devices for displays, appliances, and automotive components. Examples of potential applications include liquid crystal displays (LCDs), electrophoretic displays (EPD), organic light emitting diode displays (OLEDs), plasma display panels (PDPs), and the like. In particular, the expanding use of ion exchangeable thin sheet glass in these markets has prompted the desire for shaped three-dimensional glass sheets, with an emphasis on combinations of flat portions with highly curved, localized shapes.

Currently, glass sheets are commonly fabricated by a flowing molten glass to a forming body whereby a glass ribbon may be formed by a variety of ribbon forming process techniques, for example, slot draw, float, down-draw, fusion down-draw, or up-draw. The glass ribbon may then be subsequently divided to provide sheet glass suitable for further processing into a desired application. Subsequent fabrication techniques that allow for modification of the shape of the glass sheet are desirable to extend the number of applications wherein flat glass could be used. A good example is the case of automotive windshields, where current designs are far from simple flat shapes.

However, there are significant challenges to modifying the shape of thin flat glass sheets. For display applications, optical clarity of the glass sheet is extremely important and maintaining the "pristine" nature of the fusion formed surface is critical. Standard molding techniques used for bending and reshaping sheet glass tend to imprint any irregularities the mold tooling may have onto the glass surface, therefore a shaping technique which limits the amount of contact the tooling has with the display area of the glass is preferred. Additionally, the demand for tighter controlled deformations (e.g., bends) and thinner glass sheets, typically 1 mm thickness or less, means that the traditional processes for bending glass sheets are not suitable as they are unable to cleanly create the necessary structures.

Thus, there is a need for processes which allow: retention of a high level of flatness in the desired areas, usually the largest area of the finished product; retention of the pristine aspect of the glass sheet; desired amount of deformation in the areas of interest; and a high level of dimensional control. Embodiments address these needs by allowing for bending and shaping sheet glass using targeted heating optionally with clamping and/or mechanical means to avoid unwanted distortions in the glass sheet while avoiding or minimizing contact with the glass. Such processes can be suitable for reforming glass sheets in a wide range of applications incorporating glass sheets such as appliances (e.g. display applications), automotive, portable electronic devices, or other devices incorporating a reformed glass sheet.

SUMMARY

An aspect of the disclosure is to provide apparatus and methods for reforming sheet glass. More particularly, an object of the present disclosure is to provide apparatus and methods for bending sheet glass with little or no unwanted distortion to the glass sheet at points outside of the bend.

A first embodiment is an apparatus for bending a glass sheet a support element that supports the body of said glass sheet, an overall heating device, a localized heating device that heats a portion of said glass sheet to a temperature sufficiently high enough to allow said portion of said glass sheet to bend, and a bending assistance device which contacts said glass sheet outside of the bending area and on the side of the bending area opposite said support element. In some embodiments, said localized heating device comprises a device that heats said glass sheet by a method comprising conduction, convection, or radiation. In some embodiments, said localized heating device comprises a conduction element. In some embodiments, said conduction element comprises a metal, metal oxide, carbon compound, intermetallic compound, ceramic, or glass ceramic. In some embodiments, said conduction element comprises platinum, nichrome, kanthal, cupronickel, doped or undoped molybdenum disilicide, metal ceramics, calrod, a positive thermal coefficient ceramic, barium titanate, lead titanate, molybdenum, or silicon carbide. In some embodiments, said bending assistance device comprises a mechanically movable device that contacts said glass sheet throughout the entire bending process. In some embodiments, said bending assistance device comprises a ceramic, glass ceramic, metal, or metal oxide.

Another embodiment is an apparatus for bending a glass sheet comprising a support element that supports the body of said glass sheet, an overall heating device, a localized heating device that heats a portion of said glass sheet to a temperature sufficiently high enough to allow said portion of said glass sheet to bend, and a constraint device which contacts said glass sheet outside of the bending area. In some embodiments, said localized heating device comprises a device that heats said glass sheet by a method comprising conduction, convection, or radiation. In some embodiments, said localized heating device comprises a device that heats said glass sheet by a method comprising radiation. In some embodiments, said localized heating device comprises an infrared heater. In some embodiments, said constraint device comprises a mechanically movable device that contacts said glass sheet only while said glass sheet is being bent. In some embodiments, said constraint device comprises a fixed device that contacts said glass sheet at a point comprising an unwanted deformation only when said glass sheet unwantedly deforms outside the bend region. In some embodiments, said constraint device comprises a ceramic, glass ceramic, metal, or metal oxide. In some embodiments, said overall heating device heats said glass sheet to a temperature below the glass transition temperature of said glass sheet. In some embodiments, said constraint device further comprises a vacuum or air pressure device.

Another embodiment is an apparatus for bending a glass sheet comprising a support element that supports the body of said glass sheet, an overall heating device, a localized heating device that heats a portion of said glass sheet to a temperature sufficiently high enough to allow said portion of said glass sheet to bend, a constraint device which contacts said glass sheet outside of the bending area, and a bending assistance device which contacts said glass sheet outside of the bending area and on the side of the bending area opposite said support element. In some embodiments, said localized heating device comprises a device that heats said glass sheet by a method comprising conduction, convection, or radiation. In some embodiments, said localized heating device comprises an infrared heater. In some embodiments, said localized heating device comprises a conduction element. In some embodiments, said conduction element comprises a metal, metal oxide, carbon compound, intermetallic compound, ceramic, or glass ceramic. In some embodiments, said conduction element comprises platinum, nichrome, kanthal, cupronickel, doped or undoped molybdenum disilicide, metal ceramics, calrod, a positive thermal coefficient ceramic, barium titanate, lead titanate, molybdenum, or silicon carbide. In some embodiments, said bending assistance device comprises a mechanically movable device that contacts said glass sheet throughout the entire bending process. In some embodiments, said bending assistance device comprises a ceramic, glass ceramic, metal, or metal oxide. In some embodiments, said constraint device comprises a mechanically movable device that contacts said glass sheet only while said glass sheet is being bent. In some embodiments, said constraint device comprises a fixed device that contacts said glass sheet at a point comprising an unwanted deformation only when said glass sheet unwantedly deforms outside the bend region. In some embodiments, said constraint device comprises a ceramic, glass ceramic, metal, or metal oxide. In some embodiments, said overall heating device heats said glass sheet to a temperature below the glass transition temperature of said glass sheet. In some embodiments, said constraint device further comprises a vacuum or air pressure device.

Another embodiment is a method of bending a glass sheet comprising providing an embodiment of the apparatus, providing an initial glass sheet, positioning said initial glass sheet in said apparatus, applying a bending assistance device to said initial glass sheet, overall heating said initial glass sheet, locally heating a section of said initial glass sheet, and bending at least one part of said initial glass sheet. In some embodiments, said applying a bending assistance device to said initial glass sheet comprises applying said bending assistance device throughout the entire bending process. In some embodiments, said initial glass sheet comprises an ion exchangeable, soda-lime silicate, EAGLE XG®, 0211-type, or alkali borosilicate glass sheet. In some embodiments, said overall heating comprises heating said initial glass sheet to a temperature below the glass transition temperature of said glass sheet. In some embodiments, said locally heating comprises heating said section of said initial glass sheet to about the glass transition temperature of said initial glass sheet. In some embodiments, the method further comprises annealing said glass sheet.

Another embodiment is a method of bending a glass sheet comprising providing an embodiment of the apparatus, providing an initial glass sheet, positioning said initial glass sheet in said apparatus, overall heating said initial glass sheet, locally heating a section of said initial glass sheet, applying a constraint device to said initial glass sheet, and bending at least one part of said initial glass sheet. In some embodiments, said applying a constraint device to said initial glass sheet comprises applying said constraint device only while the glass is being bent. In some embodiments, said initial glass sheet comprises an ion exchangeable, soda-lime silicate, EAGLE XG®, 0211-type, or alkali borosilicate glass sheet. In some embodiments, said overall heating comprises heating said initial glass sheet to a temperature below the glass transition temperature of said glass sheet. In some embodiments, said locally heating comprises heating said section of said initial glass sheet to about the glass transition temperature of said initial glass sheet. In some embodiments, the method further comprises annealing said glass sheet.

Another embodiment is a method of bending a glass sheet comprising providing an embodiment of the apparatus, providing an initial glass sheet, positioning said initial glass sheet in said apparatus, applying a bending assistance device to said initial glass sheet, overall heating said initial glass sheet, locally heating a section of said initial glass sheet, applying a constraint device to said initial glass sheet, and bending at least one part of said initial glass sheet. In some embodiments, said applying a bending assistance device to said initial glass sheet comprises applying said bending assistance device throughout the entire bending process. In some embodiments, said applying a constraint device to said initial glass sheet comprises applying said constraint device only while the glass is being bent. In some embodiments, said initial glass sheet comprises an ion exchangeable, soda-lime silicate, EAGLE XG®, 0211-type, or alkali borosilicate glass sheet. In some embodiments, said overall heating comprises heating said initial glass sheet to a temperature below the glass transition temperature of said glass sheet. In some embodiments, said locally heating comprises heating said section of said initial glass sheet to about the glass transition temperature of said initial glass sheet. In some embodiments, the method further comprises annealing said glass sheet.

In some embodiments, the process further comprises a post-bending treatment process. In some embodiments the post-bending treatment process comprises a cooling step wherein the bent glass sheet is allowed to cool to the overall heated temperature in the overall heating device prior to removal. In some embodiments, the process further comprises retaining the bent glass sheet in the overall heating device or placing the bent glass sheet in a separate heating device, to allow for post-bending treatment. In some embodiments, post-bending treatment comprises annealing.

In another embodiment, the process comprises overall heating the glass sheet in a first overall heating device, moving the glass sheet to an embodiment of the apparatus, which may, optionally, be in a second overall heating device, bending the initial glass sheet, and then optionally, moving the bent glass sheet to either the first overall heating device or to a third overall heating device for post-bending treatment.

Advantages of embodiments include: the ability to reshape thin glass sheets with minimal distortion and good geometrical control; a reshaping process that can maintain the surface quality of a fusion formed glass sheet; flexibility in the forming process to reshape complex geometries along with variable curvatures and angles; sheet size (final product size) not limited by process, but only dependent on furnace and/or device size; mold less process, no glass surface irregularities from mold contact; and edge bending of glass sheet with <2 mm radius of curvature possible.

It is to be understood that both the foregoing summary and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2. Embodiment of the direct-fired platinum-tube process set up: this drawing shows an embodiment wherein a glass sheet is placed on a refractory frame with two platinum tubes positioned parallel to each other at each end of the glass sheet and an embodiment of the bending assistance device placed on top of the ends of the glass sheet.

FIG. 3. A schematic of an embodiment of the bending device before bending: the drawing represents the positioning of the ceramic tubes and support brackets prior to the bending of the sheet.

FIG. 4. A schematic of an embodiment of the bending device after bending: the drawing represents the positioning of the ceramic tubes and support brackets after bending the glass sheet.

FIG. 8. FIG. 8A shows the constraint device, 1, applying force on top of the support element, 2, with the bending area noted as 3. FIG. 8B shows the constraint device, 1, applying force outside of the support element, 2, via vacuum pressure, with the bending area noted as 3. FIG. 8C shows the constraint device, 1, applying force on top of the support element, 2, via vacuum pressure, with the bending area noted as 3. FIG. 8D shows the constraint device, 1, applying force from below and either from within the support element or outside of the support element, 2, via vacuum pressure, with the bending area noted as 3.

FIG. 9. FIG. 9A is a schematic of the device in the X-Z plane wherein the constraint device, 1, is positioned within a few hundred micrometers of the glass sheet, but is not touching it. The glass is supported on the support element, 2, and bent via heating of the bending region, 3. FIG. 9B shows the Y-Z plane of the device in FIG. 9A, wherein 1 again represents the rigid constraint device that is spaced slightly away from the glass sheet, 4, and only contacts the glass if the glass unwantedly deforms. Additionally, the support element is noted by 2.

FIG. 13. A picture of a 2 mm bend radius along with measurement points.

DETAILED DESCRIPTION

Figure 1:
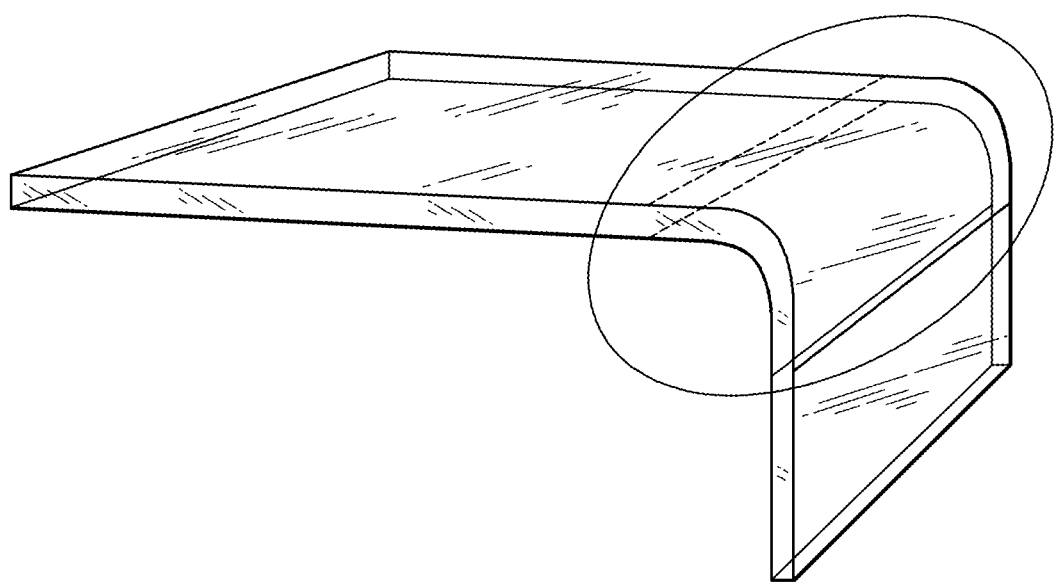
FIG. 1. Pictoral representation of a thin glass sheet showing a 90° bend and identifying the bending area as the region between the section lines highlighted by the circle.

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made to the various aspects described herein, while still obtaining the beneficial results. It will also be apparent that some of the desired benefits can be obtained by selecting some of the disclosed without utilizing other features. Accordingly, those who work in the art will recognize that many modifications and adaptations are possible and can even be desirable in certain circumstances and are a part of the disclosure. Thus, the following description is provided as illustrative and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The term "support element" refers to an object used to support the glass sheet within the apparatus. The support element may comprise any shape that allows for placement of the glass sheet in the apparatus, supports the glass sheet, and allows for the glass sheet to be bent. The support element typically supports the major portion, or "body," of the glass sheet. The support element may contact the glass sheet on either one or both faces, or may change contact points as the glass is processed. The support element may be designed to allow for multiple bends to be done without moving the glass sheet, or for multiple bends to be done simultaneously. Further, the support element may allow for complex shapes or bends to be made to the glass sheet, for example by comprising a support that is flexible, or can change shape. Examples of support elements include, but are not limited to, solid- or honeycomb-type plates or surfaces, external support frames, support columns, rollers or conveyors, or elements that produce air pressure or vacuum pressure. In the case of elements that produce air pressure or vacuum pressure, it may be the case that such elements allow the glass sheet to avoid physical contact with a solid support.

The term "overall heating device" refers to a heating device that may be used to heat the entire glass sheet simultaneously, and may optionally also heat the support element, constraint device and/or the bending assistance device. The overall heating device may heat the glass sheet by any known heating process and may operate by, but is not limited to, resistance heating, combustion heating, induction heating, or electromagnetic heating. Heat transfer from the overall heating device to the glass sheet may occur via convection, conduction, or radiation. Examples of embodiments of overall heating devices include, but are not limited to kilns, such as a lehr or tunnel kiln, or static furnaces that may be bottom loaded or of a top hat type. Additionally, the overall heating device may comprise multiple heating devices, which optionally, may be used in individually in different process steps.

The term "localized heating device" refers to a heating device which only heats a portion of the glass sheet. The localized heating device may heat the glass sheet by any known heating process and may operate by, but is not limited to, resistance heating, combustion heating, induction heating, or electromagnetic heating, such as infrared, laser or microwave heating. Heat transfer from the overall heating device to the glass sheet may occur via convection, conduction, or radiation. Examples of embodiments of localized heating devices include, but are not limited to infrared heaters, lasers, burners, or shaped metal contacts, such as platinum, silicon carbide, or molybdenum disilicide rods, which conduct heat to the glass sheet. In some embodiments, the localized heating device may be used contemporaneously with the overall heating device, but it may also be used subsequent to the overall heating device.

The term "bending assistance device" refers to an element in contact with, or applying force to, the non-bending part of the glass substrate at a point outside the localized heating area and that is capable of providing additional control to the bending process. The bending assistance device may comprise any shape or structure that allows for it to contact or apply force to the glass sheet and assist in bending the glass and/or allows the device to perform the function of improving the bend properties and/or bend characteristics, allows for bending of the glass sheet at lower temperatures, and/or reduces the time needed for bending the glass sheet. Examples of embodiments of bending assistance devices include, but are not limited to, rollers or wheels on rotating brackets attached to the support element that contact the glass sheet and allow for the contact point between the bending assistance device and the glass sheet to move as the sheet bends.

The term "constraint device" refers to an element in contact with, or applying force to, the non-bending part of the glass substrate at a point on the same side of the bend as the support element that is capable of limiting unwanted distortions or deformations to the glass sheet as a result of the bending process. The constraint device may comprise any shape or structure that allows for it to contact or apply force to the glass sheet and prevent unwanted deformation in the glass sheet. Examples of embodiments of the constraint device, include, but are not limited to, solid- or honeycomb-type plates or surfaces, external support frames, columns or rollers, or elements that produce air pressure or vacuum pressure. In the case of elements that produce air pressure or vacuum pressure, it may be the case that such elements allow the glass sheet to avoid physical contact with a constraint device.

When reshaping many glasses, such as current ion exchangeable glasses that are fusion formable, the entire sheet has to be heated to avoid cracking. This requires heating the entire sheet, for example in a furnace, and then reshaping it before it can cool down. However, to maintain flatness of the portion of the sheet area where reshaping is not desired, i.e., outside the bending area (see FIG. 1), a minimum temperature for the overall heating of the sheet may be preferred. Lower overall temperatures improve the surface quality of the flat portion of the glass sheet, as the sheet is less likely to show marks or damage where it has contacted any solid elements (e.g., the support element, bending assistance device and/or the constraint device). Further, elevated overall temperature can create distortions in the flat regions of the sheet or create uneven bending geometries.

One aspect is to allow for lowering of the overall temperature of the glass sheet during the bending process. As compared to other glass sheet bending devices and process, embodiments may be used with thinner glasses and/or glasses having higher thermal expansion glass compositions (such as ion exchangeable glasses which have a high CTE) with fewer occurrences of instabilities.

Some embodiments enable bending and shaping of flat sheets of glass using overall heating below the glass transition state along with localized heating in the bend region to form a select bend region. In some embodiments, the bending and shaping of flat sheets of glass comprises using overall heating below the softening point along with localized heating in the bend region to form a select bend region.

In some embodiments, the glass sheet comprises multiple layers of glass, which may be laminated. In some embodiments, the layers of glass comprise different glass compositions.

Other embodiments enable bending and shaping of flat sheets of glass using overall heating along with localized heating in the bend region to form a select bend region. Embodiments may be used with any type of glass sheet. In some aspects, embodiments are useful for ion exchangeable, soda-lime silicate, EAGLE XG®, 0211-type, or alkali borosilicate glass sheet. In some embodiments, the thickness of the glass sheet comprises about 100 μm, 200 μm, 300 μm, 400 μm, 500 μm, 600 μm, 700 μm, 800 μm, 900 μm, 1 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, or 5.0 mm. In some embodiments, the bend in the glass sheet comprises a radius of 100 μm, 200 μm, 300 μm, 400 μm, 500 μm, 600 μm, 700 μm, 800 μm, 900 μm, 1 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, 15 mm, 20 mm, 25 mm, 30 mm, 35 mm, 40 mm, 50 mm, 60 mm, 70 mm, 80 mm, 90 mm, 100 mm, 125 mm, 150 mm, or 200 mm. In some embodiments, the bend comprises a curve that with a radius greater than 200 mm. In some embodiments, the bend in the glass sheet comprises a radius from about 200 μm to about 5 mm, from about 200 μm to about 3 mm, from about 200 μm to about 2 mm, from about 200 μm to about 1 mm, from about 300 μm to about 5 mm, from about 300 μm to about 3 mm, from about 300 μm to about 2 mm, from about 300 μm to about 1 mm, from about 400 μm to about 5 mm, from about 400 μm to about 3 mm, from about 400 μm to about 2 mm, from about 400 μm to about 1 mm, from about 500 μm to about 5 mm, from about 500 μm to about 3 mm, from about 500 μm to about 2 mm, or from about 500 μm to about 1 mm. In some embodiments, the bend comprises a complex curve, such as a spline, or a combination of curves of various radii.

In some embodiments, heating by the overall heating device comprises resistance heating, combustion heating, induction heating, or electromagnetic heating. In some embodiments, the overall heating device comprises a kiln. In some embodiments, the overall heating device comprises a furnace. In some embodiments, the overall heating device comprises multiple heating devices, which optionally, may be used in individually in different process steps. In some embodiments, the overall heating device helps to prevent stress in the glass sheet after the sheet is bent. In some embodiments, the overall heating device is used to anneal the glass sheet after it has been bent.

In some embodiments, overall heating comprises heating the glass at a temperature below the glass transition temperature, the annealing temperature, the deformation point, or the softening point. In some embodiments, overall heating comprises heating the glass at a temperature of about the glass transition temperature, the annealing temperature, the deformation point, or the softening point. In some embodiments, overall heating comprises heating the glass at a temperature above the glass transition temperature, the annealing temperature, the deformation point, or the softening point. In some embodiments, overall heating of the glass sheet comprises heating to a temperature wherein the viscosity of the glass is from about $10^{10}$ to about $10^{21}$ Poise, about $10^{11}$ to about $10^{18}$ Poise, about $10^{13}$ to about $10^{15}$ Poise. In some embodiments, overall heating of the glass sheet comprises heating to a temperature wherein the viscosity of the glass is about $10^7$, $10^8$, $10^9$, $10^{10}$, $10^{11}$, $10^{12}$, $10^{13}$, $10^{14}$, $10^{15}$, $10^{16}$, $10^{17}$, $10^{18}$, $10^{19}$, $10^{20}$, or $10^{21}$. In some embodiments, overall heating comprises heating the glass at a temperature of about in a range from about 350° C., 400° C., 450° C., 500° C., 550° C., 580° C., 600° C., 620° C., 650° C., 700° C., or 750° C.

In some embodiments, overall heating of the glass sheet comprises heating at a temperature about equivalent to the glass transition temperature of the glass sheet. In some embodiments, the glass transition temperature, $T_g$, comprises the point at which the viscosity of the glass is about $10^{13}$ Poise. In some embodiments, the overall heating temperature comprises a range from about −70° C. to +70° C. relative to the glass transition temperature of the glass sheet. In some embodiments the glass transition temperature is about 500° C., 550° C., 580° C., 600° C., 620° C., 650° C., 700° C., or 750° C.

Another aspect comprises the use of localized heating of the glass sheet to provide control of the bending process. The localized heating process comprises a key factor in optimizing the curvature of the bend. The glass sheet has to be heated in a narrow band to localize the deformation. The parameters that allow for achieving a narrow band include the geometry and position of the heating element (influencing the heat flux), the overall temperature (if the overall temperature is low, glass outside the bending region will not deform rapidly because of the heat transfer by conduction coming from the heated region), and the heating power, (high power values allow for rapid increases in temperature, allowing for the maintenance of relatively low temperatures outside the bend area). The ability to apply a higher local heating power directly impacts the time required to bend the glass part. In the case where the bending step is the bottle neck of the process (other steps being progressive heat up and cooling) this may be an advantage.

In some embodiments, localized heating comprises heating the glass at a temperature below the annealing temperature, the deformation point, the softening point, or the melting point. In some embodiments, localized heating comprises heating the glass at a temperature of about the glass transition temperature, the annealing temperature, the deformation point, or the softening point. In some embodiments, localized heating comprises heating the glass at a temperature above the glass transition temperature, the annealing temperature, the deformation point, or the softening point. In some embodiments, overall heating of the glass sheet comprises heating to a temperature wherein the viscosity of the glass is from about $10^7$ to about $10^{14}$ Poise, about $10^8$ to about $10^{13}$ Poise, about $10^9$ to about $10^{12}$ Poise. In some embodiments, overall heating of the glass sheet comprises heating to a temperature wherein the viscosity of the glass is about $10^7$, $10^8$, $10^9$, $10^{10}$, $10^{11}$, $10^{12}$, $10^{13}$, or $10^{14}$. In some embodiments, localized heating comprises heating the glass at a temperature of about in a range from about 500° C., 550° C., 580° C., 600° C., 620° C., 650° C., 700° C., 750° C., 800° C., 850° C., 900° C., 950° C., 1000° C., 1050° C., or 1100° C.

In some embodiments, localized heating of the glass sheet comprises heating at a temperature about equivalent to the softening point of the glass sheet. In some embodiments, the softening point comprises the Littleton softening point, comprising the point at which the viscosity of the glass is about $10^{7.6}$ Poise. In some embodiments, the softening point comprises the dilatometric softening point, comprising the point at which the viscosity of the glass is about $10^9$ to about $10^{11}$ Poise. In some embodiments, the softening point is determined by the Vicat method (ASTM-D1525 or ISO 306), the Heat Deflection Test (ASTM-D648), fiber elongation method (ASTM-C338), and/or a ring and ball method (ASTM E28-67). In some embodiments, the localized heating temperature comprises a range from about −70° C. to +70° C. relative to the softening point of the glass sheet. In some embodiments the softening point is about 620° C., 650° C., 700° C., 726° C., 750° C., 800° C., 850° C., 900° C., 950° C., or 1000° C.

Some embodiments allow the localized heating source to be in contact or very close proximity to the glass sheet for precise localized heating, minimizing overall glass temperature, and/or preventing distortions in the glass sheet in order to provide good control of the resulting shape and/or geometry. Localized heating may comprise any number of mechanisms, for example via radiation, conduction, or convection. Localized heating may be done via infrared heater, flame torch or burner, resistance heating of an element, or other means known to one of skill in the art. In some embodiments, localized heating comprises use of radiative heating. In some embodiments, localized heating comprises us of an IR heater. IR heaters, as used in embodiments, may be used in conjunction with any number of mirrors or other optics to produce a narrow, focused beam on the glass.

In other embodiments, the localized heating device comprises a conduction element, such as, but not limited to, a resistively heated metal rod. In some embodiments, the conduction element comprises a metal, metal oxide, carbon compound, intermetallic compound, ceramic, or glass ceramic. In some embodiments, the conduction element comprises platinum, nichrome, kanthal, cupronickel, doped or undoped molybdenum disilicide, metal ceramics, calrod, positive thermal coefficient ceramic, barium titanate, lead titanate, molybdenum, or silicon carbide. As an example, the embodiment, 200, in FIG. 2 comprises direct fired platinum rods, 202, on ceramic support pedestals. The platinum rods, 202, conductively heat the glass sheet, 203, allowing a minimum area of the glass sheet 203 to be locally heated. While platinum conduction elements, 202, are shown in the example, the only limitation on which materials could be implemented as conduction elements is that the elements necessarily need to be able to reach a temperature in the range of the softening point of the glass being reshaped. A temperature near the dilatometric softening point of the glass may be used to maintain sheet flatness while still allowing reshaping. For example, temperatures around the $3.5 \times 10^9$ poise range are necessary to reshape glass sheets of Corning Code 2318 alkali aluminosilicate glass.

In some embodiments, the conduction element, 202, comprises a shape that reflects the desired shape of the bend in the glass, 203. In some embodiments, multiple conduction elements are present to make more complex shapes. In some embodiments, the conduction element comprises a circular, oval, square, polyhedral, spline-like, or ornamental cross-section. In some embodiments, the cross-section of the conduction element comprises a circle. In some embodiments, the radius of the circular cross section of the conduction element is about 100 µm, 200 µm, 300 µm, 400 µm, 500 µm, 600 µm, 700 µm, 800 µm, 900 µm, 1 mm, 2 mm, 3 mm, 4 mm, 5 mm, 6 mm, 7 mm, 8 mm, 9 mm, or 10 mm.

In some embodiments, the conduction element further comprises a mechanical support. In some embodiments, the mechanical support helps to maintain the structural integrity and straightness of the conduction element while under load, and may further act as a heat sink to allow for improved cooling of the conduction element. In some embodiments, the mechanical support comprises a metal oxide, carbon compound, intermetallic compound, ceramic, or glass ceramic. In some embodiments, the mechanical support comprises a ceramic or glass ceramic.

In some embodiments, the conduction element is optionally coated with a release agent. The release agent may comprise any compound or combination of compounds known to reduce or prevent the glass sheet from adhering to the conduction element. In some embodiments, the glass sheet is coated with compound to prevent adhesion to the conduction element. In some embodiments, the release agent comprises boron nitride, graphite or other carbon forms, or mineral oil.

Another aspect comprises apparatus, 200, and methods comprising a bending assistance device, 201, for decreasing bending cycle time, decreased radius of curvature, and a lowering of the overall temperature of the glass sheet, 203, during the bending process. In some embodiments, the apparatus, 200, comprises a bending assistance device, 201. In some embodiments, the bending assistance device, 201, assists with the glass bending process. In some embodiments, the bending assistance device, 201, contacts the glass sheet, 203, on outside of the localized heating area and on the opposite side of the localized heating area from the support element. FIG. 3 shows a simplified schematic of an embodiment wherein bending assistance devices, 201, are present at both ends of a glass sheet, 203. In this embodiment, the localized heating element is a metal tube positioned below the glass sheet, 203. Upon activation of the localized heating element and when the glass reaches bending temperature, the bending assistance devices, 201, can be manually applied, automatically applied, or may assist gravity in bending the glass sheet, 203. FIG. 4 is a picture of an embodiment comprising platinum tubes on ceramic supports along with an embodiment of the bending assistance device, 201 wherein the figure shows the glass sheet, 203, after the bending process.

In some embodiments, the bending assistance device comprises a metal, metal oxide, carbon compound, intermetallic compound, ceramic, or glass ceramic. As noted above, the bending assistance device may comprise any shape or structure that allows for it to contact or apply force to the glass sheet and assist in bending the glass and/or allows the device to perform the function of improving the bend properties and/or bend characteristics, assists in bending of the glass sheet at lower temperatures, and/or reduces the time needed for bending the glass sheet. In some embodiments, the bending assistance device comprises a roller, wheel, tube, rod, or other element with a circular cross-section. In such embodiments, the bending assistance device can change relative position on the glass sheet without damaging the surface of the sheet as the sheet bends. In some embodiments, the bending assistance device comprises a plate or other element with a non-circular cross section that maximizes contact with the glass sheet so as to minimize likelihood of deforming the surface of the glass sheet.

Additionally, in some embodiments, the bending assistance device may comprise one or more brackets that position the bending assistance device and allow it to rotate and/or move as the glass bends so as to maintain contact and/or pressure on the glass sheet. The bending assistance device may comprise any material that retains structural integrity at the temperatures in embodiments of the claimed process. While shown in the embodiment in FIG. 3 making a 90° bend, the bending assistance device may be used to make bends of any angle. The bending assistance device may assist in preparing bend angles from greater than 0° to about 170°, greater than 0° to about 160°, greater than 0° to about 150°, greater than 0° to about 140°, greater than 0° to about 130°, greater than 0° to about 120°, greater than 0° to about 110°, greater than 0° to about 100°, greater than 0° to about 90°, greater than 0° to about 80°, greater than 0° to about 70°, greater than 0° to about 60°, greater than 0° to about 50°, greater than 0° to about 40°, greater than 0° to about 30°, greater than 0° to about 20°, or greater than 0° to about 10°.

Another aspect comprises apparatus and methods comprising a constraint device for preventing unwanted distortions to the glass sheet and allowing for a lowering of the overall temperature of the glass sheet needed during the bending process. In some embodiments, the apparatus comprises a constraint device. In some embodiments, the constraint device prevents the glass sheet bending or warping outside of the bending region. In some embodiments, the constraint device comprises an element that is movable and only contacts the glass sheet during the bending process. In some embodiments, the constraint device comprises an element that is immovable and only contacts the glass sheet if it deforms during the bending process. In some embodiments, both the bending assistance device and constraint device are present.

Figure 5A:
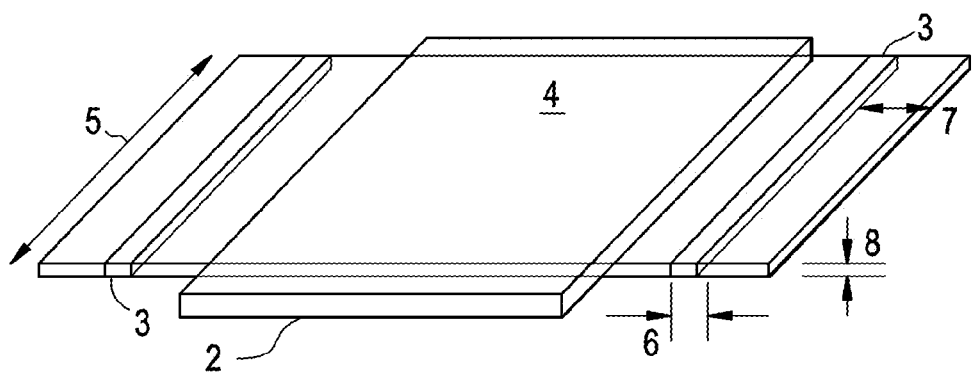
FIG. 5. An illustration (FIG. 5A) of the process layout for a case where two linear bends are to be made on a flat glass part. Reference number 4 denotes the glass sheet, reference number 2 denotes an embodiment of the support element, reference number 3 describes the bending regions, reference number 6 is the region that is locally heated to deform, 7 is the region of the glass from the edge to the bending region, and reference number 8 refers to the thickness of the glass sheet.
FIG. 5B is a graph of the surface map of the sample, showing a bump in the vicinity of the bent area.
Figure 5B:
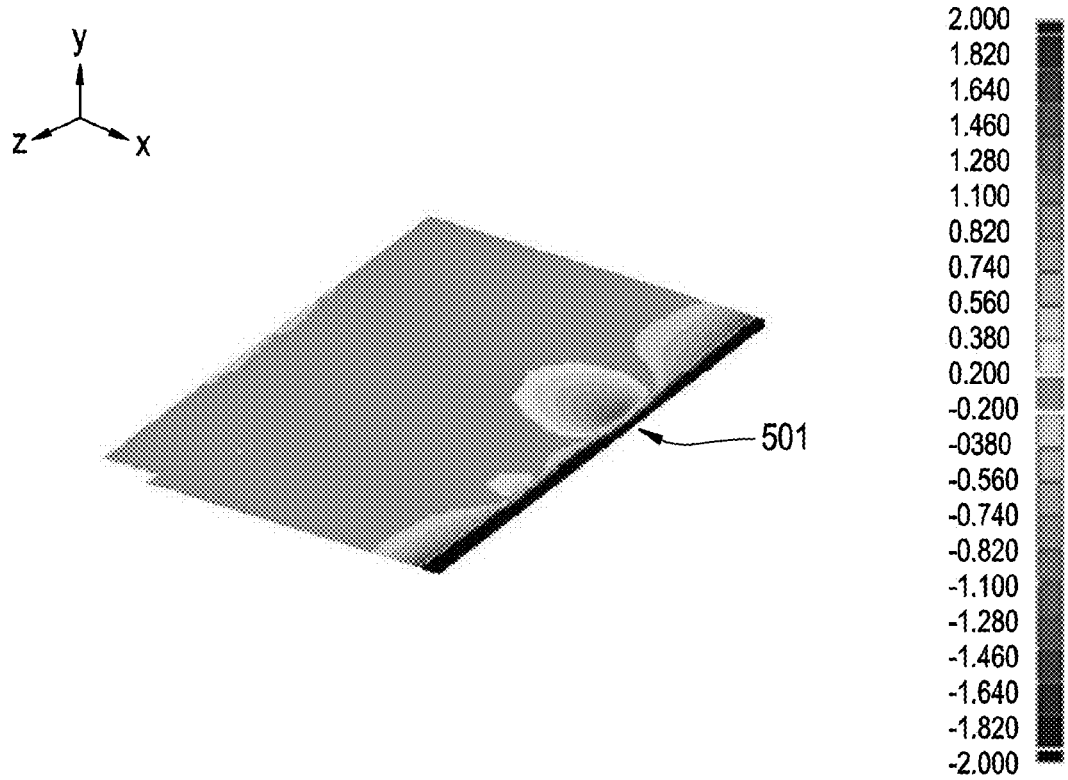
Figure 6A:
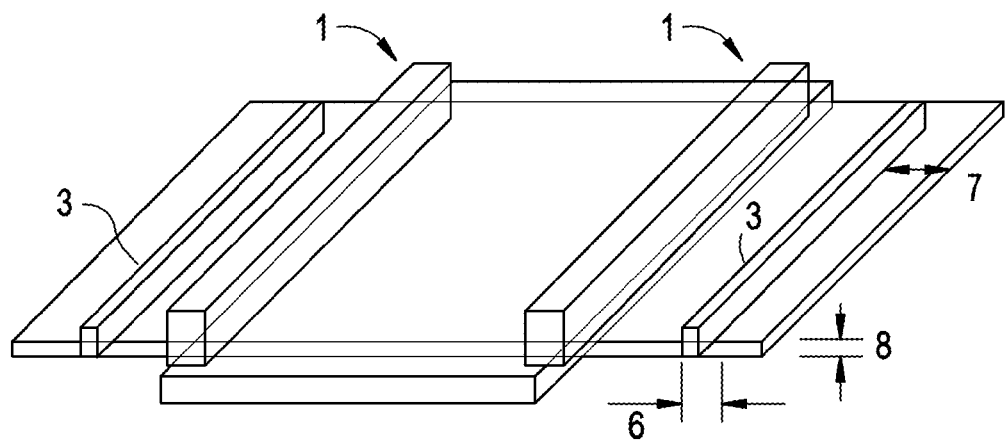
FIG. 6. An illustration (FIG. 6A) of the process described in FIG. 5A, with the addition of an embodiment of the constraint device, reference number 1 onto the glass, in the vicinity of the area to bend. Reference number 3 describes the bending regions, 6 is the region that is locally heated, reference number 7 is the region of the glass from the edge to the bending region, and reference number 8 refers to the thickness of the glass sheet. The load may be actuated to contact the glass only when required.
FIG. 6B is a graph of the surface map of the sample one showing the stability of the sample when the constraint device is applied.
Figure 6B:
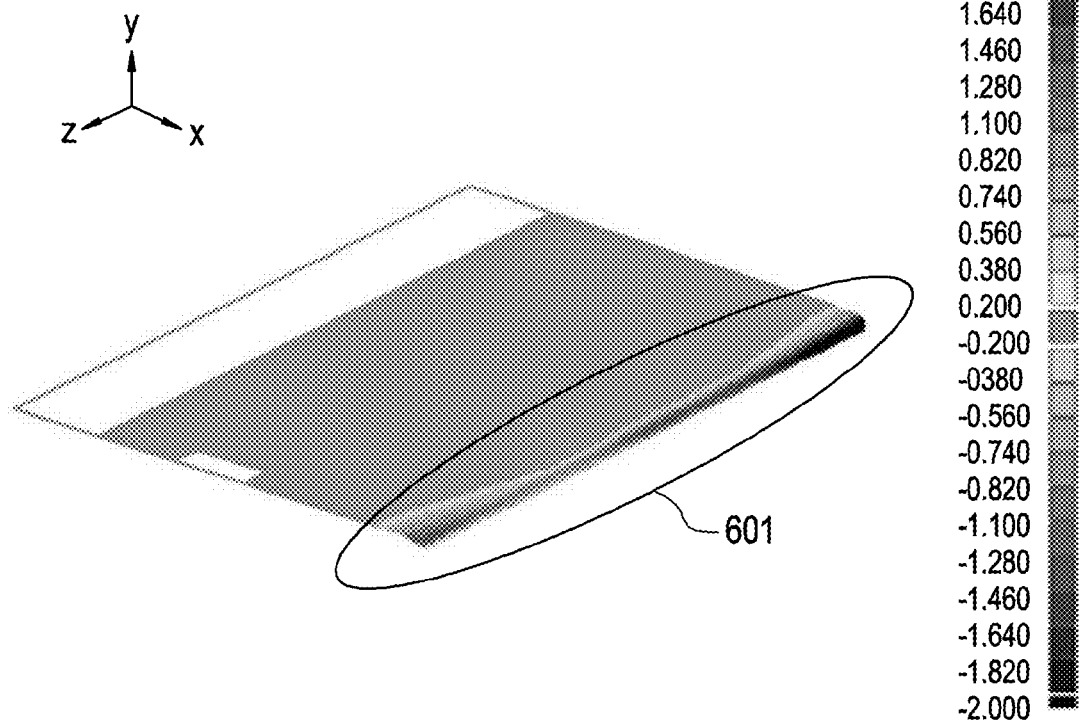

FIG. 5A shows an unconstrained glass sheet subjected to localized, radiative heating above the temperature necessary to allow the glass to deform. As expected, the glass bends, but the resulting bend causes deformation of the glass surface outside of the bending area (501 in FIG. 5B). In one embodiment, a method of avoiding unwanted deformation outside of the bending area is to use a constraint device is used to apply pressure to the glass sheet outside the bending zone, in essence compressing the glass sheet against the support element (FIG. 6A). FIG. 6B shows the resulting structure of the glass sheet after bending when an embodiment of the constraint device is used. As can be seen, the glass sheet near the bend is much more uniform and has significantly less distortion.

While not wanting to be constrained to any theory, it is believe that the constraint element prevents movement of the glass sheet outside the bending region and therefore, essentially "locks" the sheet into its flat conformation, eliminating the possibility of deformation during the localized heating cycle. More specifically, in the theory of elastic plates, there is a description of the compressed plate stability (see, e.g., Ronald D. Ziemian, GUIDE TO STABILITY DESIGN CRITERIA FOR METAL STRUCTURES, p. 1078, (Wiley, 2010), hereby incorporated by reference.)

$$\sigma_{cr} = \frac{\pi^2 \psi}{3(1-v^2)} E \left(\frac{h}{b}\right)^2$$

where E is a Young module, ☐v is a Poison's ratio, ψ is a parameter depended on boundary conditions of the plate, wherein the minimal value of the parameter ψ=0.1, h is the thickness of the plate and b the width of the area in compression ("5" in FIGS. 5 and 6). This case corresponds to conditions where there is no cold length, (denoted as "7" in FIGS. 5 and 6), meaning, the zone of localized heating goes to the edge (reference no. "7"=0).

The value of $\sigma_{cr}$ determines a limit above which the plate is not stable and subject to a deformation. The analogy is not strictly valid for glass bending because, as the material is not purely elastic, it indeed dissipates part of the stress by viscous relaxation. However, in glass submitted to a non-uniform temperature field, compressed stresses can be estimated by the following formula:

$$\sigma_y = E\alpha\Delta T$$

where α is the glass coefficient of thermal expansion ("CTE"), ΔT is a temperature difference between the heated zone and the rest part of the glass sheet. One can then see that the parameters impacting the stability of the glass sheet upon localized heating are 1) glass thickness—the thinner the glass, the lower the stress above which out of plane deformation occurs; 2) glass CTE—instabilities are favored for high CTE compositions, such as ion exchangeable glasses; and 3) local temperature gradient—increasing the temperature difference between the preheating environment and the heated area allows for a tighter radius of curvature and reduced cycle time, but also favors instability.

Figure 7:
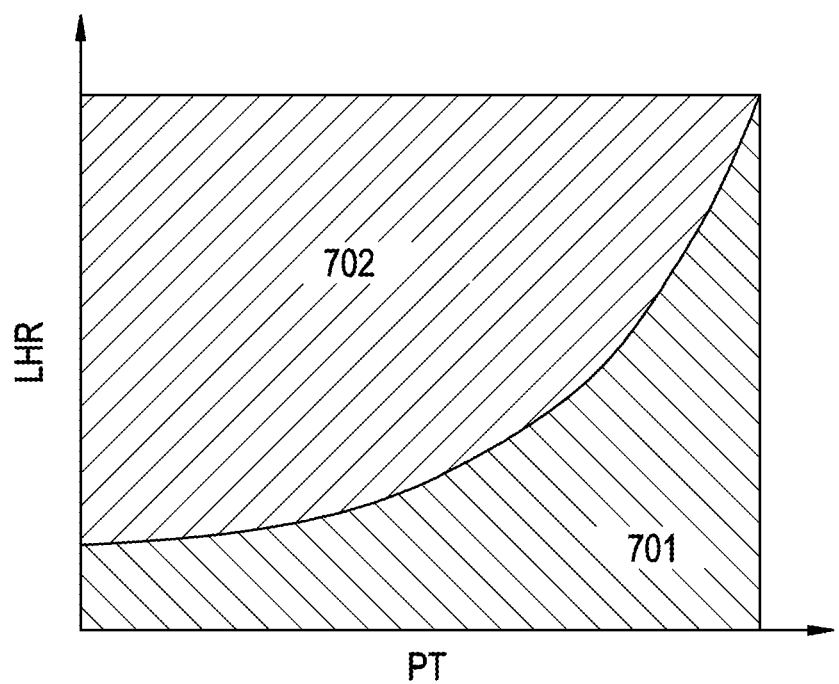
FIG. 7. A schematic representation of the process window regarding the stability of the flat part of the glass sheet. A relation between preheating temperature and local heating rate defines the stable and unstable domains. High local heating rates are desired to decrease cycle time and radius of curvature, while lower preheating temperatures are desired to maintain optical surface quality and shape. The curve position is correlated with bend length, where longer bends shift the curve down.
Figure 8A:
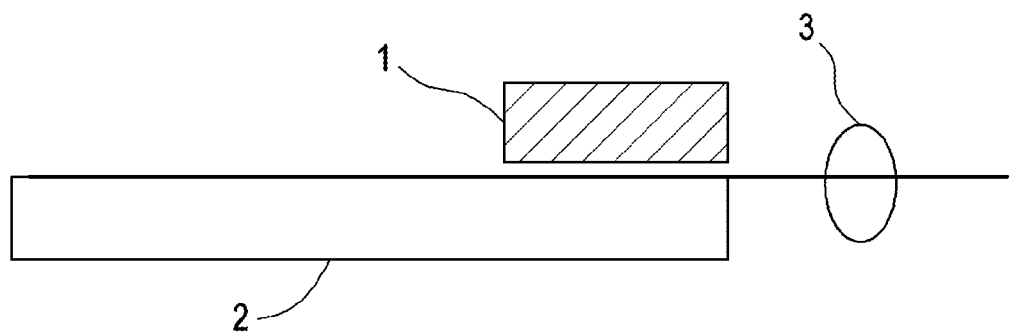
FIGS. 8A-D show various embodiments of the constraint device and their location relative to the support element and glass sheet. All figures are drawn in the X-Z plane.
Figure 8B:
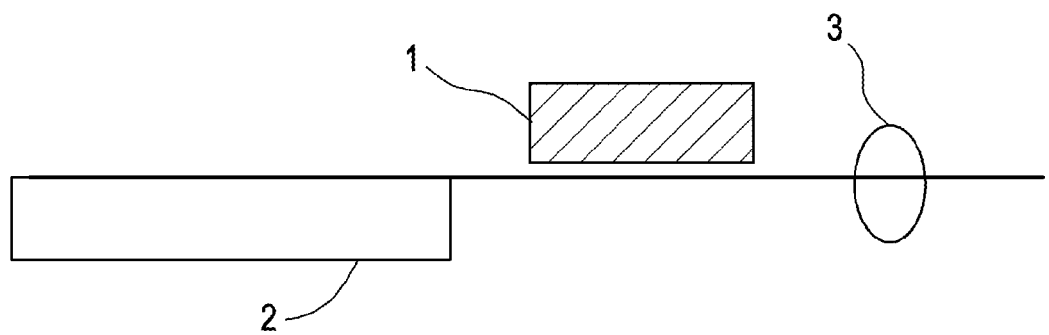
Figure 8C:
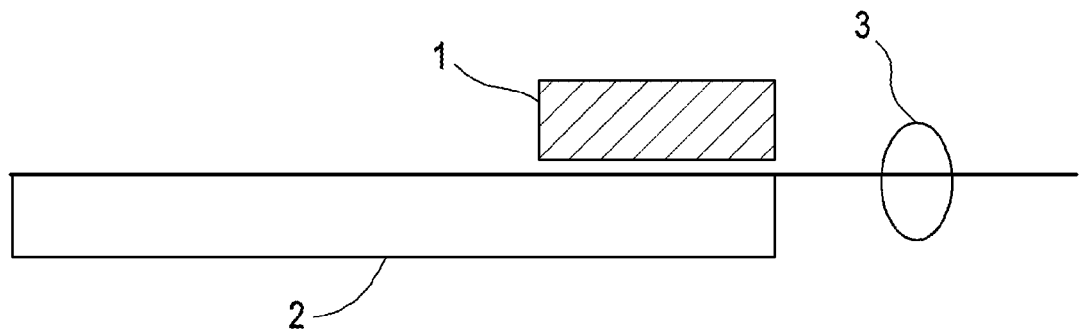
Figure 8D:
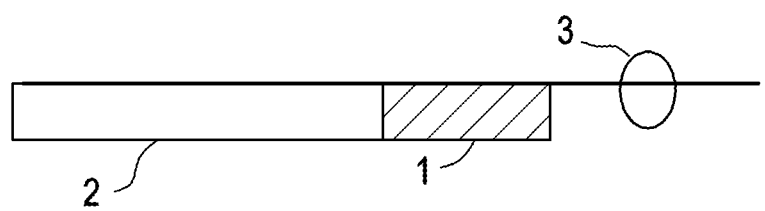

The use of a constraint device impacts the stability of the glass sheet in a number of ways. As illustrated in FIG. 7, decreasing the preheating temperature tends to lead increase the likelihood of instability. However, as noted previously, for surface quality reasons it is desirable to minimize this temperature, an observation being that below the glass transition temperature is a good practice. For example, it has been shown that in embodiments comprising a constraint device, it is possible to decrease the preheating temperature down to 520° C., using a glass having a glass transition temperature of 580° C.

The application of the constraint device is generally done only during the localized heating step. In some embodiments, the constraint device is applied onto a portion or the whole width of the bend, and located as close as possible to the locally heated area without marring the surface of the glass. In some embodiments, the distance between the load and the locally heated area has to be within a range bounded by the lower limit distance, which is defined by the distance wherein marks appear due to the contact of heated glass by a solid material. Practically, the limit comprises a distance of about 1 mm, 2 mm, 3 mm, 4 mm, 5 mm, 6 mm, 7 mm, 8 mm, 9 mm, 10 mm, 15 mm, or 20 mm. In some embodiments, the distance between the load and the locally heated area has to be within a range bounded by the upper limit distance, which is defined by the distance wherein unacceptable deformation occurs between the bend and the constraint device. Practically, for preheating temperatures 10° C. below the transition, and local heating rate above 150° C./min, the limit comprises a distance of about 10 mm, 15 mm, 20 mm, 25 mm, 30 mm, 35 mm, 40 mm, 45 mm, 50 mm, 55 mm, 60 mm, 70 mm, 75 mm, 80 mm, 85 mm, 90 mm, or 100 mm.

The contact pressure between the load and the glass comprises a force moderate enough to avoid the creation of optical defects. The constraint device may be applied to the top, bottom or both faces of the glass and may comprise any material that retains structural integrity at the temperatures in embodiments of the claimed process (FIGS. 8A-D). Examples of materials used in the embodiments of constraint devices, but are not limited to, ceramic, glass ceramic, inorganic compounds, carbon-based compounds, and glasses, and combinations thereof. The contact pressure required to maintain a flat glass surface is on the order of about 100, 150, 200, 250, 300, 350, 400, 450, 500, 550, 600, 650, 700, 750, 800 N/m$^2$, and may be brought about by any of the means constituting the different embodiments. Additionally, the contact material may comprise, but is not limited to, glass ceramic, stainless steel, or porous or fiber board ceramic.

The constraint device may also comprise a heat sink, which may allow for increased temperature variations between the localized temperature and overall temperature of the glass sheet, or thermal isolation of the bend and flat regions of the glass sheet. In embodiments where the constraint device also comprises a heat sink, the constraint device may comprise a metal piece to act in both a constraint and thermal sink capacity.

Figure 9A:
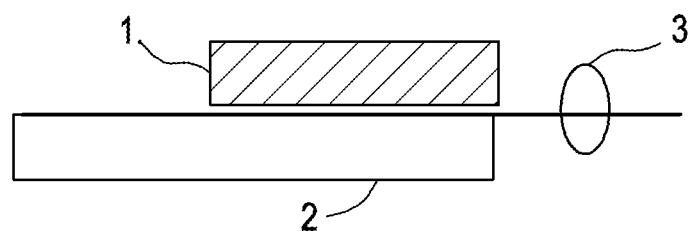
FIGS. 9A-B show embodiments of the constraint device wherein the constraint device only contacts the glass sheet if the glass sheet unwantedly deforms in a region outside the bending area.
Figure 9B:
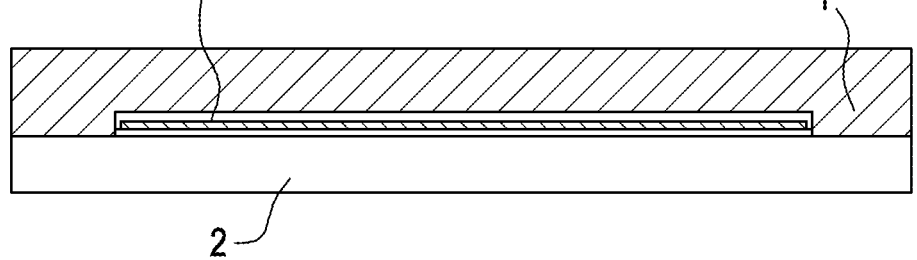
Figure 10:
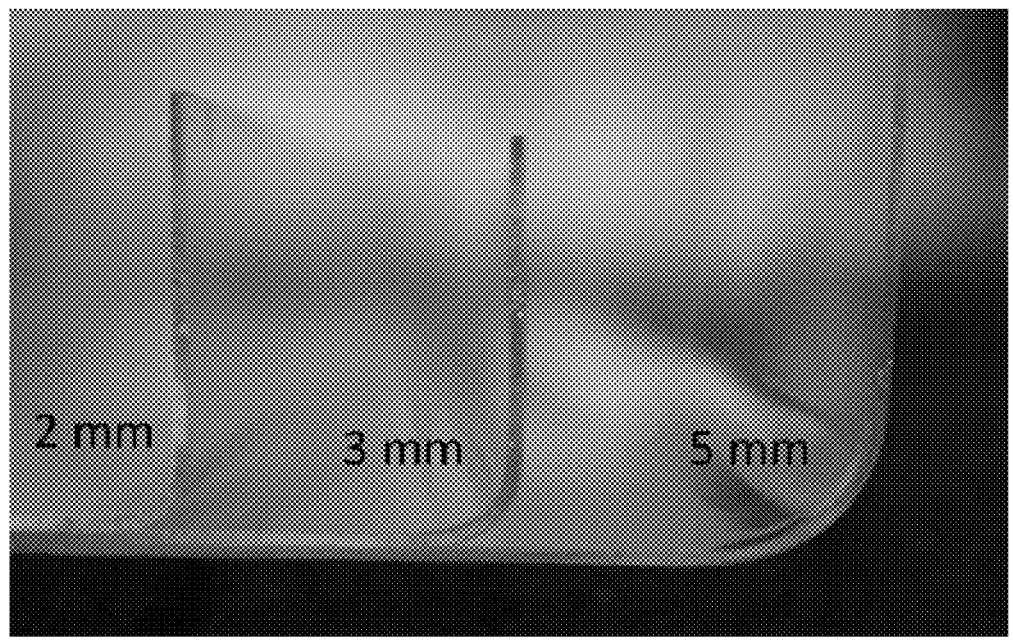
FIG. 10. Picture showing glass sheets having various bend radii of 2, 3, and 5 mm from the end edge perspective.
Figure 11:
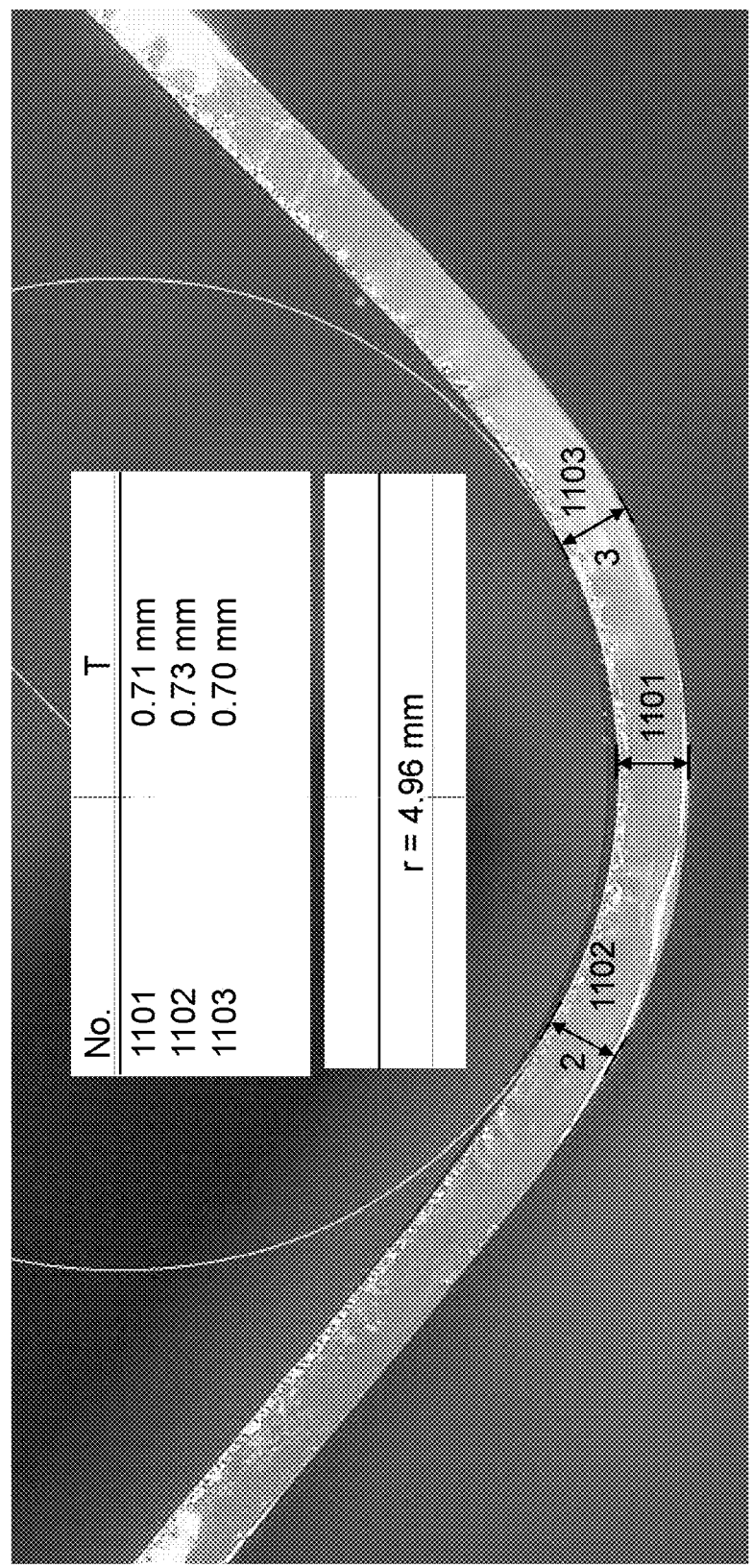
FIG. 11. A picture of a 5 mm bend radius along with measurement points.
Figure 12:
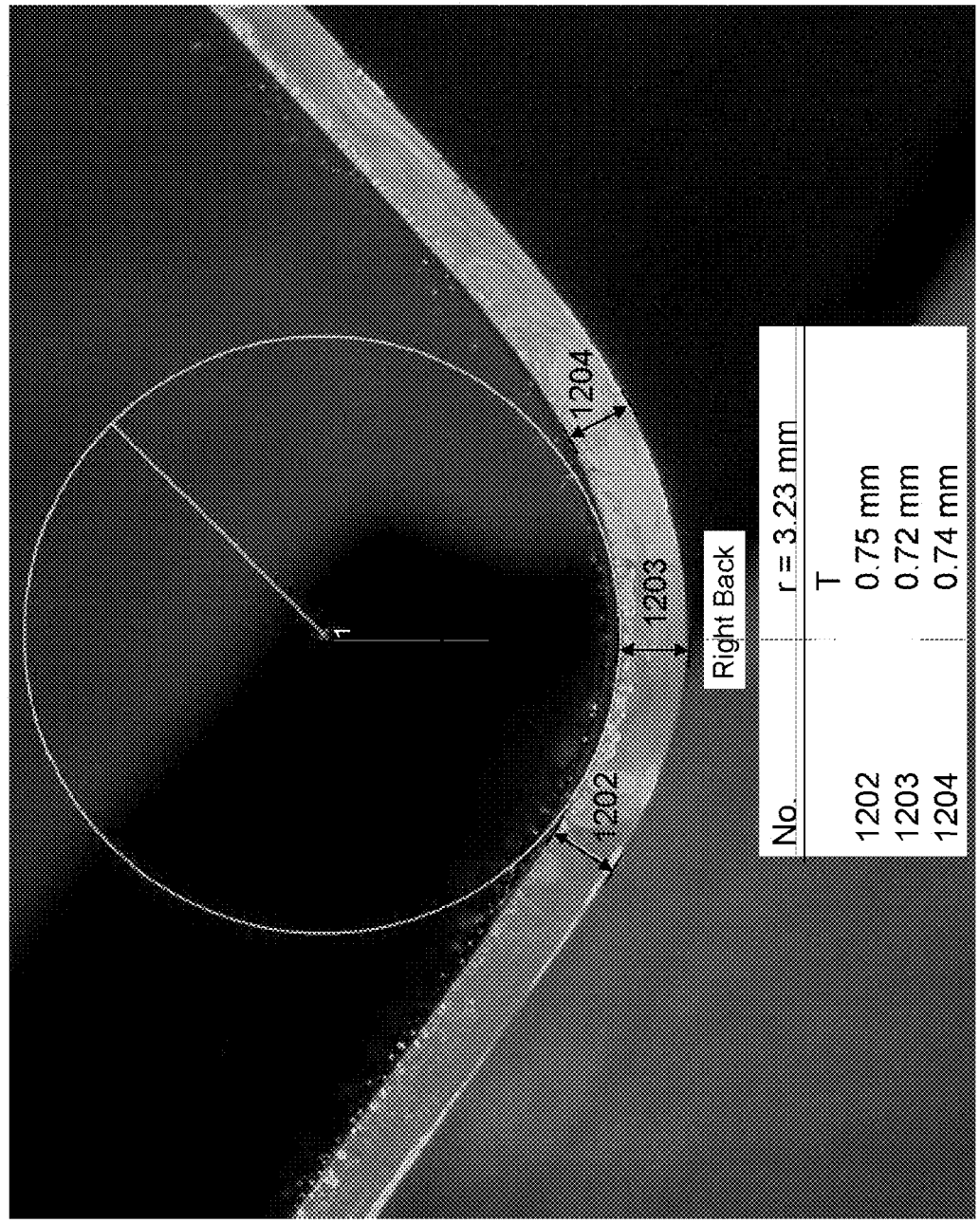
FIG. 12. A picture of 3 mm bend radius along with measurement points.

In another embodiment, the constraint device comprises a rigid body positioned above the glass and above the support element and prevents the glass sheet from freely deforming during the bending process (FIGS. 9A and 9B). In this embodiment, a minor gap may be present between the glass sheet and the constraint device, and contact between the constraint device and the glass sheet only takes place when deformation of the sheet exceeds the gap spacing. An advantage of this embodiment is that contact with the glass is only partial and only in areas where the glass deforms. In some embodiments, the spacing between the glass and the rigid constraint device comprises about 10, 20, 30, 40, 50, 60, 70, 80, 90, 100, 150, 200, 250, 300, 350, 400, 450, 500, 550, 600, 650, 700, 750, 800, 850, 900, 950, or 1000 μm.

EXAMPLES

Example 1

A Wilt furnace having a 600×1700 mm base area was used to perform experiments. The furnace could be raised and lowered over the base for accessibility to the bending system. Two platinum rods or tubes were positioned parallel to each other on the furnace floor and at a separation distance determined by the final shaped length of the glass sheet.

The platinum tubes were supported off the furnace floor on each end by refractory V-blocks. A refractory plate or frame mounted on refractory blocks was placed between the tube support blocks to support the glass sheet. A ceramic tube or rod was inserted into the platinum tube as a mechanical support to maintain the straightness of the platinum tubes and keep them from bending. Current was supplied to the platinum tubes by using platinum straps welded to the tube ends with the other ends connected to cooled copper electrical buss blocks. A transformer stepped down the line voltage and increased the amperage going into the platinum tubes. A controller was connected to a semiconductor-controlled rectifier ("SCR") to control the power and the resulting temperature generated by the platinum tubes. Thermocouples were placed in contact at the center area of each tube and at each tube end. The controller was controlled by one of the center thermocouples acting as a "control thermocouple." A seventh thermocouple was placed under the glass sheet to read the furnace internal temperature. The furnace itself had two internal thermocouples with one supplying feedback to the controller for the furnace.

An optional release agent was applied to the tubes to help keep the glass from sticking to the platinum tubes at elevated temperatures. The release agent used was a boron nitride spray (EKamold® EP EKS Ceramics GmBH). The boron nitride was lightly applied to the platinum tubes, and then the platinum tubes were heated to 200° C. for 10 minutes to bake on the release agent. Initially, some release agent residue would appear on the glass sheet after bending, but if the control temperature was maintained below 700° C., then no residue was observed. Alternatively, several glass sheets were prepared for acid etching studies, and after the etching process the residue was removed.

The glass sheet was scribed and cut to the particular size of interest. Prior to the glass sheet placement on the refractory plate or frame, the refractory setter plate was leveled and accurately positioned between the platinum tubes. The setter plate used was a ¼" thick refractory silica board (RSLE-57 manufactured by ZIRCAR), which had been cut to size. Once the glass sheet had been placed on the setter plate, the thermocouples are positioned to be in contact with the platinum tubes on each end and one in the center. Alignment of the platinum tubes was checked along with the sheet position so that the correct shape could be formed.

The furnace is closed and taken to a preheat temperature of 525° C. and allowed to reach thermal equilibrium. Power is applied to the tubes and a temperature is selected that allows the glass to soften enough to bend but not hot enough to distort other areas of the sheet. Initial trials involved bending the glass sheet via its own weight. Once the sheet has under gone bending or reshaping the power is removed from the platinum tubes and the glass sheet is allowed to cool in the furnace.

Example 2

While initial trials involved bending the glass sheet via its own weight and gravity, a mechanical gravity assisted shaping tool was also implemented. A mechanical bending device was designed to assist with the glass bending process. This device comprised a ceramic tube and two support end brackets that allowed the ceramic tube to "roll" via gravity over the sheet edge as it softened. This bend assisting device enabled sheet edges to be shaped at lower temperatures and at faster time intervals.

Using this device also allowed shorter edge lengths of the glass sheet to be bent as compared to earlier trials without the device. Previously, with shorter sheet edges, gravity bending alone necessitated either longer time intervals or higher temperatures. For example, if a sheet edge shorter than approximately 100 mm was required on the final piece, it was most practical to scribe the edge and laser cut to size after bending. However, the laser cutting would have added an additional step to the process, and some cuts were poor due to residual stress in the sheet especially around the bend area. Using the 100 mm long sheet edge, which provided enough glass weight to produce a good geometrical bend radius, took on the order of 15 minutes to achieve the bend at temperatures≈730° C. With the addition of the bend assisting device, it was possible to successfully bend sheet-edge lengths of 10 mm in around 3 to 4 minutes at 700° C. for 5, 3 and 2 mm bend radii (see FIGS. 10, 11, 12, and 13).

Comparatively, attempting to bend a sheet edge length of 10 mm without the bending device increased the time interval to 30 minutes and a platinum tube temperature above 800° C. The resulting bend was non-uniform along the width of the sheet, with some distortion along the sheet center surface and higher contamination on the bend surface from the release agent. Therefore, the bend assisting device enabled good geometrical bends at lower temperatures and faster times.

After the glass sheet was positioned on the setter plate, the thermocouples were placed along the platinum tubes and the alignment of the platinum tubes was checked, the bend assisting device was placed on the sheet. The bend assisting device was positioned on the top glass sheet surface near the outer edge of the sheet. The ceramic tube support brackets were designed to attach to the platinum tubes at each end beyond the sheet width. These brackets enabled the ceramic tube to sit on the glass surface near the outer most edge of the glass sheet and move freely. When the glass sheet was locally heated and started to soften, the ceramic tubes were able to move downward via gravity as the sheet bends. The added weight of the ceramic tubes assisted in bending the sheet, which takes less time and temperature, and helped to apply even stress to the glass, allowing for a more controlled bend.

When the glass sheet and bending device were in position, the Wilt furnace was ramped up to 580° C. and held at this temperature throughout the bending cycle. The thermocouple temperatures were plotted using data acquisition software that allowed for monitoring of the thermal profile of the platinum tubes and also recorded the Wilt furnace temperature. As the Wilt furnace temperature reached equilibrium at 580° C., the platinum tube power control was energized. The controller for the direct fired platinum tubes was ramped up to 680° C. at a rate of 50° C. per minute. The PID control parameters were tuned for the specific size of platinum tubing in order to minimize any temperature overshoot and maintain tight control of the temperature. Once the 680° C. temperature was achieved, it took approximately four minutes for the sheet to fully bend to the desired shape. The temperature along the length of each tube was somewhat variable, but all thermocouples read within the 680 to 700° C. range.

The sheet started to bend almost immediately once the platinum tubes reached the 680° C. temperature. The additional several minutes was required to ensure that the bend was complete on both sides to the desired final angle. Bend angles up to 90 degrees were achieved with angles less than 90 degrees made by using a refractory plate to stop the glass edge from bending any further. More complex shapes and larger angles are possible by using different platinum tube sizes and shapes along with refractory forms that allow specific bend angles. The direct-heated platinum tubes enabled reshaping the glass sheet at a lower temperature, avoiding embossing or the creation of surface defects from contact, which is not the case with using molds for reshaping glass at higher temperatures.

After the sheet was fully bent to the desired angle, power was shut off to the platinum tube and the sheet was allowed to cool to the internal furnace temperature of 580° C. The sheet and furnace were allowed to slowly cool to below 250° C. before opening the furnace and allowing a faster cooling rate. This slow cooling took several hours to achieve, but it had been observed that taking a bent sheet out while the furnace is above 300° C. could cause the sheet to crack.

In some cases, the bending area could contain residual stress even when the glass was allowed to cool slowly. Therefore, an optional step of annealing the sheet after bending, either with the sheet in place or by annealing after it was removed, was done. It was found that annealing was best done after the sheet had been removed from the bending system and was laid on a flat surface with the bend edges upward. This prevented bowing of the sheet during the anneal cycle with the ceramic bend assisting device still on it and optionally applying tension to the sheet.

Example 3

On a commercial scale, a manufacturing process requires a much faster cycle time to make the bends, and then post-heat treat. One possible process is to use a Lehr or tunnel kiln to preheat the glass sheet, move the sheet to a forming platform, bend the sheet, and then place the sheet back in the same kiln for post-thermal treatment. This setup avoids making the bending apparatus the bottle-neck of the commercial process.

Another possibility is to have the sheet come through a Lehr or tunnel kiln, bring the platinum tubes up to the sheet while at the same time bringing the bending assisting device into contact with the glass, and bending the sheet without moving it from the conveyor belt. While more complicated, this process allows for rapid reshaping of the glass sheets in an assembly line fashion.

An alternative approach is to use a furnace to preheat the glass sheet, a second furnace for bending, then after bending, transfer the glass to an annealing furnace. If the glass sheet is on a refractory plate which does not lose temperature between transfers, for example a silica plate, then the glass sheet can be transferred without cracking. A benefit of the direct-fired platinum tubes is that the lower surrounding temperatures enable shuffling glass sheets to and from the bending apparatus with less loss of heat and less potential for cracking. With the short bending times, embodiments of the claimed process allow manufacturing of multiple parts and a higher throughput.

What is claimed is:

1. An apparatus for bending a glass sheet having a bending area and a non-bending area, comprising:
   a. a support element;
   b. an overall heating device;
   c. a localized heating device that creates a localized heating area in the glass sheet bending area; and
   d. a constraint device which contacts said glass sheet outside of and adjacent to the bending area, wherein the constraint device is in contact with, or applying force to, the non-bending part of the glass sheet at a point on the same side of the bend as the support element, and is capable of limiting unwanted distortions or deformations to the glass sheet as a result of the bending process.

2. The apparatus of claim 1, wherein said localized heating device comprises a device that heats said glass sheet by a method comprising conduction or radiation.

3. The apparatus of claim 2, wherein said localized heating device comprises a device that heats said glass sheet by a method comprising radiation.

4. The apparatus of claim 3, wherein said localized heating device comprises an infrared heater.

5. The apparatus of claim 2, wherein said localized heating device comprises a device that heats said glass sheet by a method comprising conduction.

6. The apparatus of claim 2, wherein said localized heating device comprises a conduction element.

7. The apparatus of claim 6, wherein said conduction element comprises a metal, metal oxide, carbon compound, intermetallic compound, or ceramic.

8. The apparatus of claim 1, wherein said constraint device comprises a mechanically moveable device that contacts said glass sheet only while said glass sheet is being bent.

9. The apparatus of claim 1, wherein said constraint device comprises a fixed device that contacts said glass sheet at a point comprising an unwanted deformation only when said glass sheet unwantedly deforms outside the bend region.

10. The apparatus of claim 1, wherein said constraint device comprises a ceramic, glass ceramic, metal, or metal oxide.

11. The apparatus of claim 1, wherein said constraint device further comprises a heat sink.

12. The apparatus of claim 1, further comprising a bending assistance device that applies a force to a non-bending area of the glass substrate at a point outside the localized heating area, wherein the bending assistance device provides additional control to the bending process.

13. A method of bending a glass sheet comprising:
a. providing the apparatus of claim 1;
b. providing an initial glass sheet;
c. positioning said initial glass sheet in said apparatus;
d. overall heating said initial glass sheet;
e. locally heating a section of said initial glass sheet;
f. applying a constraint device to said initial glass sheet; and
g. bending at least one part of said initial glass sheet.

14. The method of claim 13, wherein said applying a constraint device to said initial glass sheet comprises applying said constraint device only while said initial glass sheet is being bent.

15. The method of claim 13, wherein said applying a constraint device to said initial glass sheet comprises application of a fixed device that contacts said glass sheet at a point comprising an unwanted deformation only when said glass sheet unwantedly deforms outside the bend region.

16. The method of claim 13, wherein said initial glass sheet comprises an ion exchangeable soda-lime silicate, alkali borosilicate, or alumina borosilicate glass sheet.

17. The method of claim 13, wherein said overall heating comprises heating said initial glass sheet to a temperature wherein the viscosity of the glass sheet is from about $10^{10}$ to about $10^{21}$ Poise.

18. The method of claim 13, wherein said locally heating comprises heating said section of said initial glass sheet to a temperature wherein the viscosity of the glass sheet is from about $10^7$ to about $10^{14}$ Poise.

\* \* \* \* \*